(12) United States Patent
Harris

(10) Patent No.: US 8,602,565 B2
(45) Date of Patent: Dec. 10, 2013

(54) PROJECTED DISPLAY

(75) Inventor: Scott C. Harris, Rancho Santa Fe, CA (US)

(73) Assignee: Harris Technology, LLC, Rancho Santa Fe, CA (US)

( * ) Notice: Subject to any disclaimer, the term of this patent is extended or adjusted under 35 U.S.C. 154(b) by 1087 days.

(21) Appl. No.: 12/581,835

(22) Filed: Oct. 19, 2009

(65) Prior Publication Data

US 2011/0090192 A1  Apr. 21, 2011

(51) Int. Cl.
*G03B 21/20* (2006.01)

(52) U.S. Cl.
USPC .......... 353/85; 353/30; 353/31; 353/69; 353/70; 353/94; 345/591; 345/593; 348/189

(58) Field of Classification Search
USPC ......... 353/30, 31, 69, 70, 71, 74, 79, 85, 94, 353/119, 122; 348/189–190, 744–745; 345/591, 593, 30, 55, 84, 87–104, 207, 345/690
See application file for complete search history.

(56) References Cited

U.S. PATENT DOCUMENTS

| | | | |
|---|---|---|---|
| 6,219,011 B1 * | 4/2001 | Aloni et al. | 345/1.3 |
| 6,811,267 B1 * | 11/2004 | Allen et al. | 353/122 |
| 6,879,311 B2 * | 4/2005 | Sono | 345/94 |
| 8,130,184 B2 * | 3/2012 | Garner et al. | 345/84 |
| 8,373,692 B2 * | 2/2013 | Uchiyama et al. | 345/207 |
| 2004/0001182 A1 * | 1/2004 | Dyner | 353/28 |
| 2009/0091623 A1 * | 4/2009 | Krogstad | 348/189 |

* cited by examiner

*Primary Examiner* — Georgia Y Epps
*Assistant Examiner* — Sultan Chowdhury
(74) *Attorney, Agent, or Firm* — Law Office of Scott C. Harris, Inc.

(57) ABSTRACT

A reprojection system which allows a projection to be displayed onto a display screen, and reprojected by that display screen. The display is received on the surface that itself displays, and it is then redisplayed on the surface. The redisplay can be at the same size or at a different size as the original projection. Preferably the redisplay is at the same relative intensity but a brighter actual intensity than the original display. The information is can be received and redisplayed in a number of different ways.

28 Claims, 4 Drawing Sheets

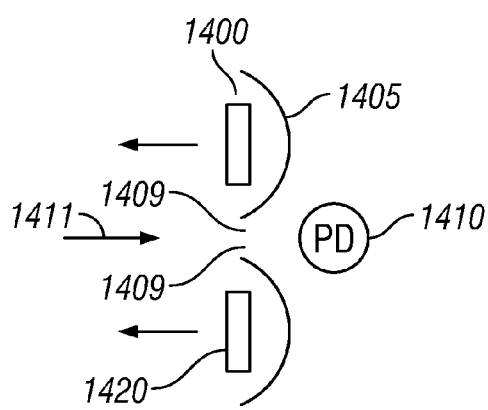
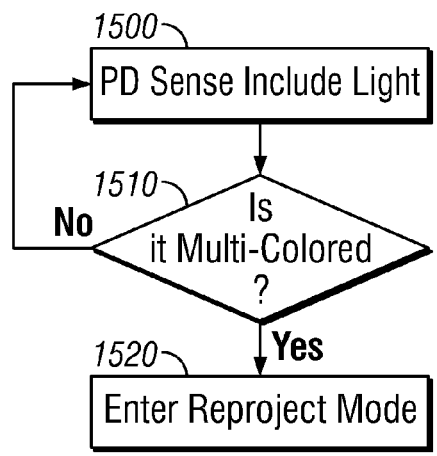
FIG. 14
FIG. 15
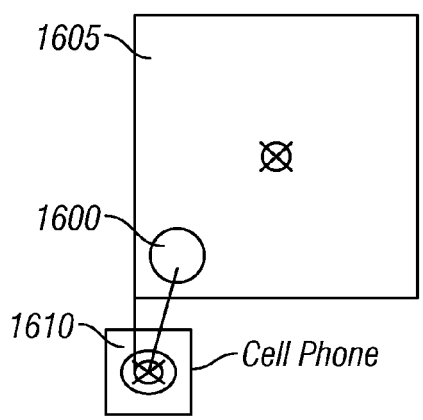
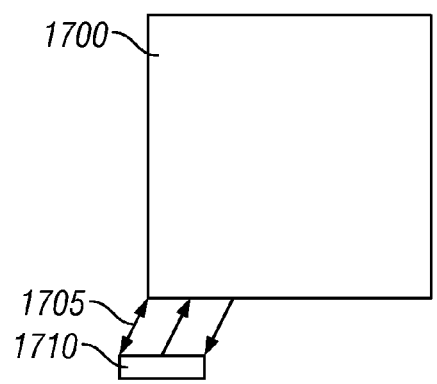
FIG. 16
FIG. 17

“PROJECTED DISPLAY”

PROJECTED DISPLAY

BACKGROUND

It is desirable to make things small. For example, cell phones, PDAs, personal music/video players and other personal devices have been miniaturized.

However, even though it is desirable to miniaturize these personal devices, this conflicts with the desire to see this media on a larger screen. Therefore, while it is desirable to have a small cell phone or Ipod, for example, it is also desirable to have a large screen TV.

SUMMARY

The present inventor recognized a trade-off and often contradiction between the personal devices and the displays for the media that can be played by the device. Users want personal devices that hold and play the media to be small. However, they want the display from such a device to be large.

An embodiment describes a redisplay device that improves a display produced by a device, e.g. by increasing the size of the display and/or by increasing the brightness of the display.

BRIEF DESCRIPTION OF THE DRAWINGS

These and other aspects will now be described in detail with reference to the accompanying drawings, wherein:

FIG. 14 shows an embodiment with light shields;

FIG. 15 shows a flowchart of automatic redisplay sensing;

FIG. 16 shows projecting from a cell phone; and

FIG. 17 shows an embodiment where a projector is coupled to a display.

DETAILED DESCRIPTION

The embodiments of this application refer to forming images, referred to generically as "projection". There are many devices that project images, that is, they produce a beam of light that is output to a target. Projectors are known which accept electronic input signals and produce a projection. For example, a personal device such as a phone that operates as a projector is described in my co-pending application Ser. No. 11/873,817, filed Oct. 17, 2007, and entitled "Communication Device with Advanced Characteristics".

However, the term "projection" as used herein is intended to cover not only the formation of a beam of light, but also any feature that produces light and which creates a remote display of an image. For example, this can include a spatial light modulator such as used in a projector, and can also include a self illuminating device such as LEDs or OLEDs. The term "display" may also be used to denote that an image (e.g., a still image, or a frame of a video formed of many frames or images) is formed in a viewable way.

Figure 1:
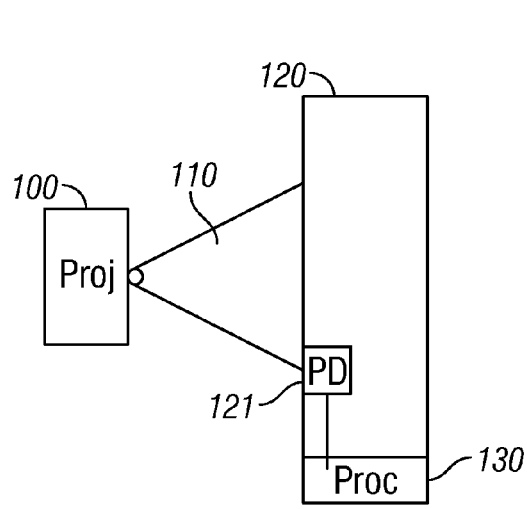
FIG. 1 shows an embodiment where a projector displays on a surface.

FIG. 1 shows an embodiment where a personal projector 100 produces a projection output 110 that is transmitted to the surface of a screen 120. In this embodiment, the screen 120 is a smart projection screen, such as a television or other device that can play media (received over a channel or based on a playing of a stored file) with a projection amplification function. In the embodiment, the projector 100 may include or be driven by, for example, a personal media player such as an iPod (TM) with media capabilities, or a small image projector such as a miniature LED projector (which typically produces low lumen output such as 400 lm or less), a computer, the phone of the type described in my co-pending application, or any other kind of projector. It should be understood that projectors which produce lower output light levels may actually produce more advantages in this embodiment. Therefore, the projection 110 is shown in FIG. 1 may create a low light projection.

Figure 2:
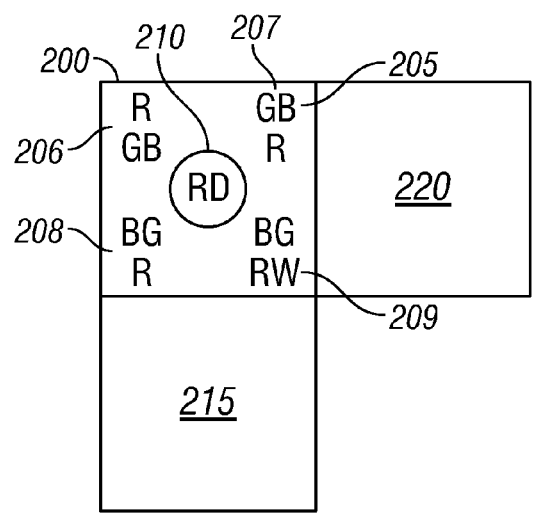
FIG. 2 shows pixel neighborhoods according to an embodiment.

A first embodiment 200 of the smart projection screen is shown in FIG. 2. In this embodiment, there are a number of pixel neighborhoods. Each pixel neighborhood such as 205 may have a number of different pixels therein. The pixel neighborhood 205 shows different image producing pixels, which produce outputs of different primary or other additive colors. In the figures, the letter R represents a red pixel, green is represented by G, blue represented by B, white by W, and amber by A. It should be understood that other pixels and other colored pixels can be used.

In this embodiment, each pixel in neighborhood 205 includes the primary color pixels in different arrangements. For example, the first pixel group 206 has the red pixel on top of the neighborhood, green and blue on the bottom. The second pixel group 207 has green and blue on top. The green and blue on top is adjacent to the red on top in pixel group 206. Similarly, the pixel groups 208 and 209 have their pixels arranged in different ways.

The neighborhoods may be repeated across the screen. The screen 200 may be formed of other pixel neighborhoods, shown generically as 215, 220.

As conventional, the screen may have millions of pixels. By changing the order of colors in the pixel groups, noise and aliasing effects in the viewing may be reduced.

It should be understood that there can be more pixels in the neighborhoods, or in some embodiments, as described herein, there may be fewer pixels or no neighborhoods at all, where each group of pixels forms its own group.

In the FIG. 2 embodiment, each pixel neighborhood 205 is associated with a single photodetector 210.

In the embodiments, the pixels can be self emitting such as LEDs or plasma, or modulating of light sources, such as LCDs, or DMDs.

Figure 3:
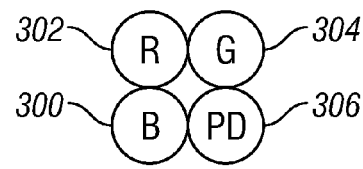
FIG. 3 shows a specific pixel neighborhood.

The photosensor 210 may itself be an RGB sensor, and may itself be formed up a number of different separated elements. In this embodiment, the photosensor is in the middle of a pixel neighborhood. Another embodiment may operate using one photosensor per pixel. In this embodiment, the devices forming each pixel are as shown in FIG. 3, with three displaying pixels 300, 302, 304, and a single photodetector 306.

While the embodiment shows these individual elements as being round, they can of course be any other shape, such a square or rectangular, as desired.

Figure 4:
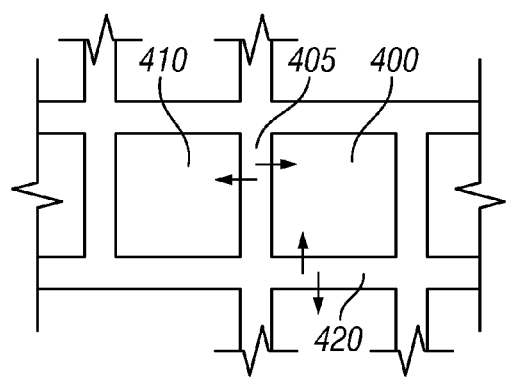
FIG. 4 shows another pixel/photoreceptor layout.

Another embodiment shown in FIG. 4 uses square pixels. In this embodiment, the display portion 400 is a multicolor projecting media pixel. For example, this can be a multicolor LED that can display in red, green, blue, white, and amber.

This allows the color of the pixel to be set to any desired color or combination of those colors, and to be initiated to operate at a desired intensity.

In this embodiment, the display pixel 400 is surrounded by photosensing portions 405. For example, the photosensing portion 405 may be a photosensor for the two adjoining pixels 400, 410. More photosensing capability may be obtained from a lower-level photosensor 420.

Figure 5:
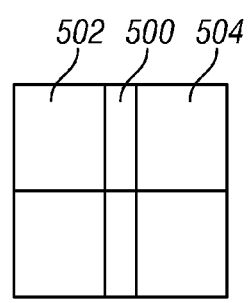
FIG. 5 shows an alternative to the FIG. 4 layout.

Another embodiment in FIG. 5 uses one photosensor 500 in between each two adjacent display pixels 502, 504.

In an embodiment, the projection may be across an area that is less than the complete capability of the display. Forever example, using a 1080 p TV, the projection may be less than 1080; it may be 640 p, 480 p, or any other size.

In operation, in any of the previously-described or future described embodiments, the system operates as follows.

Figure 6:
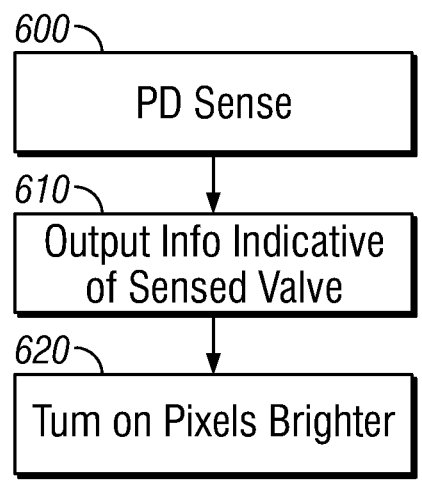
FIG. 6 shows a flowchart of pixel amplification.

FIG. 6 shows a flowchart of this operation. At 600, the system detects the incoming light in a photodetector sensing operation. Each pixel may detect the color and intensity of the pixel. In some embodiments, this may be done in a time division multiplexed fashion, while in other embodiments, this sensing may be carried out continuously.

At 610, the output from one of the photodetectors 121 is coupled to a processor 130, which may be a digital signal processor or may be the main processor that drives content for the display screen.

At 620, the processor determines how to turn on certain pixels to values that are the same as, or proportional to, the photosensed value. For example, in an embodiment where display amplification is carried out, each pixel is determined so as to have the same color, hue, saturation and relative intensity as the received value. The pixels are caused to display at a level much brighter than the incoming radiation. The display will be at a higher actual intensity than received, but the intensity of pixels relative to other pixels will be the same.

The pixels may be redisplayed or amplified in the same place as where they are projected, in one embodiment. The pixels may be displayed in different places in other embodiments as described herein.

Figure 7:
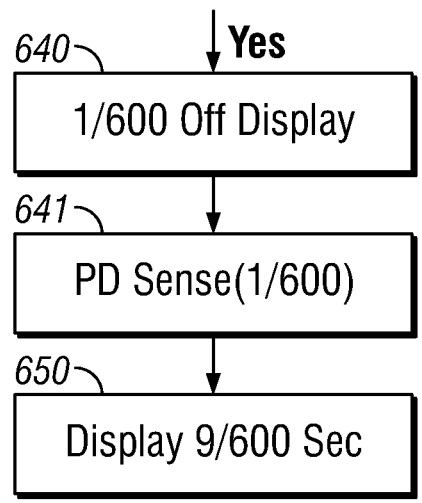
FIG. 7 shows a flowchart of multiplexing.

In one embodiment shown in the flowchart of FIG. 7, the display of the pixels may interfere with detecting the projected image. In operation, in one embodiment, the system displays its display, e.g., the amplified display, in a duty cycle, 90% of the time. For example, assuming a 60 Hz refresh cycle, during every $\frac{1}{60}$ of a second interval, the display is turned off for $\frac{1}{600}$ of a second at 640. During that $\frac{1}{600}$th of a second, the photodetector sense is carried out at 641. This may be the same photodetector sense as in 600. After the photodetector sense is finished for the $\frac{1}{600}$th of a second, the photodetector sensing is terminated, and the display occurs for the next $\frac{9}{600}$th of a second at 650.

This allows the photodetector contents to be sensed for a short period of time as a duty cycle modulated system.

In one embodiment, the projector may wirelessly communicate with the display screen, e.g., via Bluetooth, and sync the projection time with the sensing time carried out by the display. This sync will enable the projector to display during a shorter period of time, thereby reducing its power consumption. For example, the projector can display for $\frac{1}{600}$ second, then stop projecting for $\frac{9}{600}$ second. This can reduce the power consumption of the projector by as much as 90%.

In embodiments, the projection may be duty cycle projected for less than $\frac{1}{2}$ the overall projection time, more preferably less than 25%, or 10% or less as in the above embodiment.

Alternatively, the sync may be carried out using an optical signal produced by the TV that is sensed by the projector source. This may be an all-white display for $\frac{1}{600}^{th}$ second produced every minute, just before one of the sensing periods. The sync will again reduce the necessary power output for the projection.

FIG. 7 shows the duty cycle modulated system.

Figure 8:
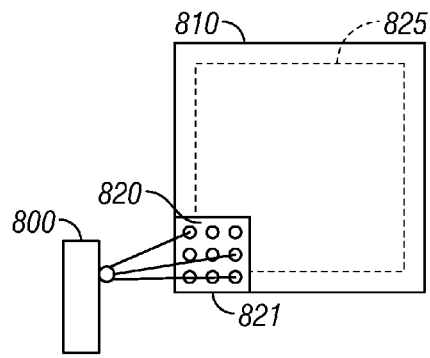
FIG. 8 shows projecting on to a portion of a screen and redisplaying on another screen portion.

FIG. 8 illustrates a screen changing embodiment. In this embodiment, the projection occurs onto only a portion of the screen, but the redisplay is carried out on a larger portion of the screen.

For example, the projection may be carried out from an area close enough to the screen that only a portion of that screen will receive the projection. In the embodiment of FIG. 8, the projector source 800 projects onto screen 810, and the projection only covers a very small portion 820 of the screen. This embodiment, the processing of FIG. 9 may be used.

Figure 9:
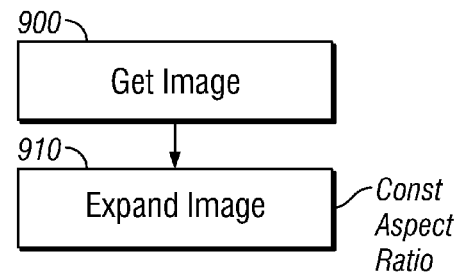
FIG. 9 shows a flowchart of expanding an image.

The flowchart of FIG. 9 shows that the image is obtained at 900. This may use any of the embodiments described herein. An electronic signal indicative of the received image is obtained from this sensing.

At 910, the image is expanded. The expansion of the image may use any conventional technique to expand an image. For example, this may use pixel filling, or pixel interpolation. This may keep the aspect ratio constant but yet expand it to the maximum size of the screen, or to the maximum usable resolution detected within the projection.**

In another embodiment this may stretch the image at least partly. For example, the image processing may stretch the edges of the image only, while keeping the content the same, or may stretch areas in the image which will not distort features in the image. This may use certain techniques as described in my co-pending application Ser. No. 11/126,492, filed Jan. 10, 2005.

This embodiment enables, therefore, shows projecting to a smaller screen portion such as 820, and then expanding and redisplaying that on a larger screen portion such as 825.

Figure 10:
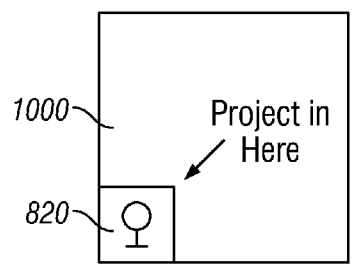
FIGS. 10-12 show separate photodetector and display portions on the screen.

According to the embodiment of FIG. 8, the TV in projection mode may display a perimeter line such as 1000 in FIG. 10. This line 1002 forms a perimeter around the area in which a projection will be received. In this embodiment of FIG. 8, the area 820 includes photodetectors therein, shown as 821 in FIG. 8. While FIG. 8 shows only nine photodetectors, there are preferably many more. This may use any of the pixel embodiments from the previous embodiments.

In this embodiment, there are photodetector pixels in the area 820. The rest of the screen other than the area 820 forms the area 825. The rest of the area 825 does not require photodetectors in the pixels. This may facilitate forming this system, since only a portion of the screen requires photodetectors.

Figure 11:
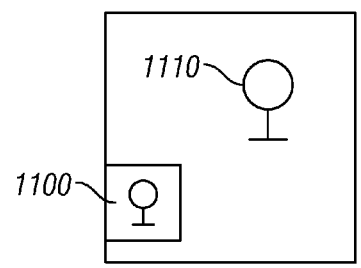

The line 1002 indicates an area within which the photodetector pixels are located. It may also display instructions such as "project in here" as shown in the FIG. 10 drawing. A projection into this area 820 may then be converted to a projection to the entire screen. Once detecting a projection in the area 820, the system may continue for example to carry out a redisplay operation. In this embodiment, for example FIG. 11, therefore, a projection in the small area shown as 1100 is translated to a projection over the entire area shown as 1110.

Figure 12:
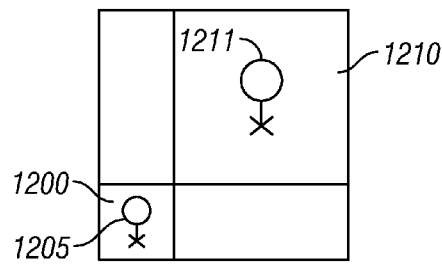

An alternative embodiment shown in FIG. 12 may avoid the time division operation of FIG. 7, and its possibility of being perceived as being flickering, by devoting a small area of the screen 1200 to being solely a receiver on that area. Therefore, the small area 1200 receives an image such as 1205, and other areas of the screen 1210 then re-project that image as 1211. In this embodiment, there is no need to turn off the projection at intervals. Also in this embodiment, some parts of the display screen do not require photosensors.

Figure 13:
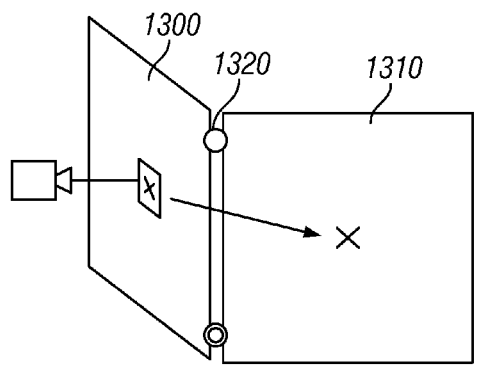
FIG. 13 shows a separate photodetector portion.

Another embodiment, shown in FIG. 13 may use a foldout portion 1300 that is attached to the main screen 1310. This foldout portion can be hinged on a hinge 1320, or can be pulled out in any other way. While FIG. 13 shows this as being the same height as the screen, the foldout portion can be much smaller than the screen. In this embodiment, a projection may be made on the foldout portion, and that projection is then translated to display on the main portion. Again, this may avoid the need for time division multiplexing, and its attendant possibility of flickering.

Another embodiment which may avoid the flicker as shown in FIG. 14. In this embodiment, each pixel has a project portion such as 1400, and a light shield 1405. A photodetector 1410 is located in the shadow 1409 between multiple projection pixels 1400, 1420. The pixels 1400, 1420 both project light, but the light which is projected is shaded/shielded so that it is not received by the photodetector 1410. The photodetector 1410 therefore senses incoming light such as 1411 which passes into the shadow area 1409.

In this embodiment, the processor may operate according to FIG. 15. At 1500, the photodetector 1410 senses whether there is incoming light. If so, 1510 then determines if the incoming light is multiple colored. The reason for detecting this is to determine whether this is a spotlight or flashlight, or other item which would not typically indicate that the information or the redisplay should be carried out. If not, flow returns to 1500. However, if a multiple colored light is detected, then the re-projection mode is entered at 1520. This then automatically enters re-projection mode, by detecting a projection on the screen. Moreover, this system may be used with any of the other embodiments, for example where only a portion of the screen has photoreceptors.

FIG. 16 shows an embodiment where there is a small lens camera 1600 on the display screen 1605. This small lens camera can sense for example, the display of the cell phone shown as 1610 or of an iPod. Therefore, an image shown upon the cell phone display may be re-projected onto the TV. Another embodiment, shown in FIG. 17, forms a main display 1700 with a slide out tray 1705. The slide out tray 1705 has a cradle portion 1710 at its end. The cradle portion 1710 can hold a cell phone or personal media device, and can electrically connect back device to the TV.

Although only a few embodiments have been disclosed in detail above, other embodiments are possible and the inventor intends these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, the "projection" is intended to include display of information from the computer on any other display device, including a monitor, LED device, television, or any other device. The content may be an image of any type, a photo, a presentation, a video, or any other kind of display.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A system, comprising:
a display device, having a surface that displays a displayed image, said surface including receptor portions for receiving a received image, and said surface having electrically controllable emitter portions for producing light viewed from the surface that displays a second image, said light being produced based on the received image, where the same surface receives the received image and also displays the second image, and said display device having a processing element which receives information indicative of the received image from the receptor portions, said information indicative of the received image being used by said processing element to control said emitter portions for producing said light to display said second image.

2. A system as in claim 1, wherein said processing element includes an image processing portion, that receives information indicative of the received image as a plurality of pixels, processes the output of the received image, and produces individual pixel outputs for displaying the second image based on said information indicative the received image.

3. A system as in claim 2, wherein said image is received and also displayed on a same section of the display.

4. A system as in claim 2, wherein said image is received on a first section of the display, and is displayed on a second, different section of the display.

5. A system as in claim 2, wherein the displayed image is related to the received image and said displayed image has the same relative intensity as the received image, but has a brighter actual intensity than the received image.

6. A system as in claim 2, wherein said image changes over time to form a video from multiple images, each image forming a frame of the video, and where said screen displays said displayed image for a first specified percentage of the time, and receives the received image for a second specified different percentage of the time, where a time of receiving is different than the time of displaying.

7. A system as in claim 4, wherein said first section of the display has a plurality of photoreceptors thereon, and said second portion of the display has only displaying elements thereon and no photoreceptors thereon.

8. A system as in claim 1, wherein each of a plurality of areas on said surface have both light emitters and light detectors.

9. A system, comprising:
a display device, having a surface that displays a displayed image, said surface also including receptor portions for receiving a received image, where the same surface receives the received image and displays the displayed image, and said display device having an output which outputs the received image, and said display device having an input portion which receives information indicative of the received image, said information indicative of the received image being used by said display device to display said displayed image, wherein each of a plurality of areas on said surface have both light emitters and light detectors, wherein each of said plurality of areas have a blocking portion forming a shadow area between light emitters, and wherein said light detectors are in said shadow portion between said light emitters.

10. A system as in claim 4, wherein said processor displays an indication on said first section of the display that projection should be made into said first section of the display.

11. A system, comprising:
a display device, having a surface that displays a displayed image, said surface also including receptor portions for receiving a received image, where the same surface receives the received image and displays the displayed image, and said display device having an output which outputs the received image, and said display device having an input portion which receives information indicative of the received image, said information indicative of the received image being used by said display device to display said displayed image , wherein said surface that displays an image includes a plurality of pixels arranged in a specified arrangement, where said specified arrangement includes arrangements with multiple light emitters of different primary colors, and at least one detector which receives light.

12. A system as in claim 11, wherein said plurality of pixels are arranged into superpixel groups, each superpixel group including sub pixels arranged in a specified arrangement of colors, and where each arrangement forms one color adjacent a different color in the arrangement so that no two superpixel groups have two same color subpixels next to one another.

13. A system as in claim 12, wherein said plurality of pixels are arranged into superpixel groups, each superpixel group including a plurality of subpixels, and where there is a photo detector associated with each of the subpixels.

14. A system, comprising:
a surface having display elements which emit light based on an electrical control and said surface also having receiving elements for receiving an image from an external image source;

a controller for said display elements, producing electrical signals that drive said display elements, said controller also operating to determine information indicative of the received image on said receiving elements, and to produce said electrical signals to create an output image used by said display elements to emit light based on said received image on said receiving elements, where said output image is brighter than said received image.

15. A system as in claim 14, wherein said image is a frame of a video, and where said controller produces sequential output images forming said video.

16. A system as in claim 14, wherein said image is received and also displayed on a same section of the display.

17. A system as in claim 14, wherein said image is received on a first section of the display, and is displayed on a second, different section of the display.

18. A system as in claim 14, wherein said screen displays said displayed image at a first time, and receives the received image at a second time, where the first and second times are different.

19. A system as in claim 17, wherein said first section of the display has a plurality of photoreceptors thereon, and said second portion of the display has only displaying elements thereon and no photoreceptors thereon.

20. A system as in claim 14, wherein each of a plurality of areas on said surface have both light emitters that emit light based on an electrical control, and light detectors.

21. A system, comprising:
a surface having display elements and also having receiving elements for receiving an image;
a controller for said display elements, producing outputs that drive said display elements, said controller also operating to determine information indicative of the received image on said receiving elements, and to produce an output image for said display elements based on said received image on said receiving elements, where said output image is brighter than said received image, wherein each of a plurality of areas on said surface have both light emitters and light detectors, wherein each of said plurality of areas have a blocking portion forming a shadow area between light emitters, and wherein said light detectors are in said shadow portion between said light emitters.

22. A system as in claim 19, wherein said processor displays an indication on a first section of the display that projection should be made into said first section of the display.

23. A system as in claim 14, wherein there are fewer receiving elements than displaying elements.

24. A method, comprising:
detecting an input image on a display screen in a housing, said input image being one which has been projected by a remote device onto said display screen;
using an electrical device for analyzing said input image; and
based on said analyzing, controlling electrical emitters that are in said housing for displaying a new image on the display screen, the new image being based on said input image but being brighter than said input image.

25. A method as in claim 24, wherein said electrical emitters include arrangements with multiple light emitters of different primary colors, and at least one detector which receives light.

26. The system as in claim 1 wherein said emitter portions are self emitting devices that emit light.

27. The system as in claim 1, wherein said emitter portions operate to modulate a light source to create said light.

28. A system as in claim 14, wherein said surface that displays an image includes a plurality of pixels arranged in a specified arrangement, where said specified arrangement includes arrangements with multiple light emitters of different primary colors, and at least one detector which receives light.

* * * * *